Jan. 4, 1966    C. ZYWIETZ    3,227,383
DEVICE FOR MAINTAINING THE CONSTANT TENSION OF A WIRE
BETWEEN A SUPPLY REEL AND A NON-CIRCULAR BODY TO BE
PROVIDED WITH THE WIRE WINDINGS DURING
THE WINDING OPERATION
Filed Feb. 13, 1963    2 Sheets-Sheet 1

INVENTOR
CHRISTOPH ZYWIETZ

BY

AGENT

Jan. 4, 1966  C. ZYWIETZ  3,227,383
DEVICE FOR MAINTAINING THE CONSTANT TENSION OF A WIRE
BETWEEN A SUPPLY REEL AND A NON-CIRCULAR BODY TO BE
PROVIDED WITH THE WIRE WINDINGS DURING
THE WINDING OPERATION

Filed Feb. 13, 1963  2 Sheets-Sheet 2

INVENTOR
CHRISTOPH ZYWIETZ

BY *Frank R. Ju...*
AGENT

United States Patent Office 3,227,383
Patented Jan. 4, 1966

3,227,383
DEVICE FOR MAINTAINING THE CONSTANT TENSION OF A WIRE BETWEEN A SUPPLY REEL AND A NON-CIRCULAR BODY TO BE PROVIDED WITH THE WIRE WINDINGS DURING THE WINDING OPERATION
Christoph Zywietz, Hamburg-Altona, Germany, assignor to North American Philips Company, Inc., New York, N.Y., a corporation of Delaware
Filed Feb. 13, 1963, Ser. No. 258,236
Claims priority, application Germany, Mar. 2, 1962, P 28,889
5 Claims. (Cl. 242—9)

The invention relates to a method and a device for maintaining the tension of a wire between a supply reel and a non-circular body to be provided with the wire winding during the winding operation.

It is known to brake the supply reel for maintaining a minimum wire tension between the supply reel and the body to be wound. To this end use is made inter alia of electro-motive or electro-magnetic brakes.

If very small, non-circular bodies, for example grids for use in electric discharge valves, are to be provided with fine wire windings the known mode of braking does not yield satisfactory results. The grid wire is readily broken due to the varying winding-off speed of the wire from the supply reel and due to the consequent varying tensile force. If the body to be wound rotates with constant speed but has strongly or abruptly curved body portions, the wire drawn from a supply reel accelerates and decelerates the reel thus stressing the wire, which is the case in winding the wires on a vacuum tube grid.

To overcome these disadvantages the supply reel has to fulfil the requirement that in order to maintain a constant tensile force it should correspondingly accelerate and decelerate. The known brakes are not capable of furnishing the required varying braking forces, particularly in the case of high-speed winding. Consequently, the tensile force of the wire constantly varies, so that the wire breaks.

In accordance with the invention the braking effect of a braking member for the supply reel is reduced upon a demand for a greater supply of wire and is increased with demands for a smaller supply of wire by means of a control-member arranged on the driving shaft of the body to be provided with windings. Owing to the variation in braking force in accordance with the varying length of wire, the tensile force in the wire can be kept constant. The control-member arranged on the driving shaft guarantees a fixed relationship between the state of rotation of the body to be wound and the braking force required for each state of rotation for the supply reel.

The method according to the invention is carried out by means of a device which is characterized in that the control-member is arranged on the driving shaft of the body to be wound blocks the path of a medium movable from a source towards the braking device connected with the supply reel in accordance with the condition of rotation of the body so that the medium supplies indirectly or directly the required braking force for the braking device for maintaining a constant tension of the wire under different conditions of rotation of the body.

The control-member, which rotates in synchronism with the body to be wound, is preefrably adapted to the non-circular shape of the body to be wound; if it consists of a number of blades, the number thereof corresponds with the number of unsymmetrical parts of the body. The medium may be formed by anything that can move in a predetermined direction in the form of flows, rays or waves and that can be withheld by a boundary surface. Particularly suitable are liquids, gases or light.

The invention will be described more fully with reference to the embodiments shown in the drawing.

Figure 1:
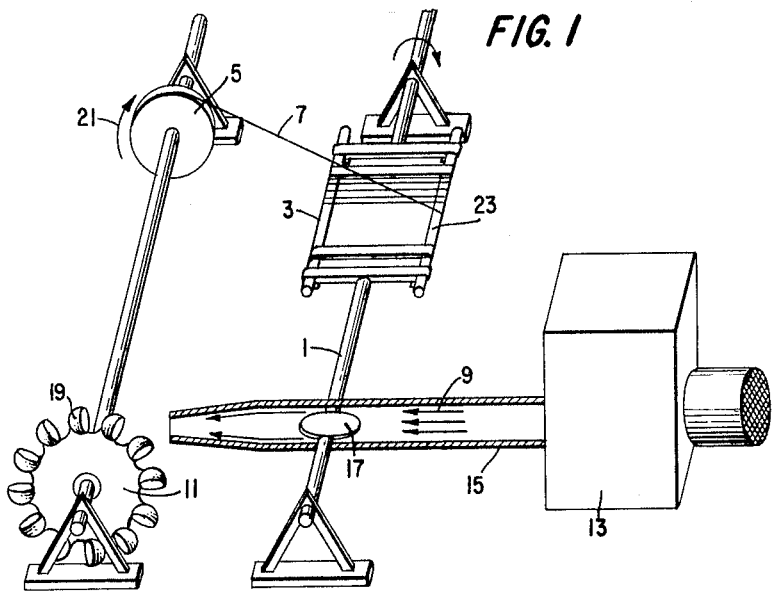
FIG. 1 shows a device according to the invention, operating with a flow of air.

The frame 3 of a stretched grid for use in an electric discharge valve is arranged on a driven shaft 1. When the driven shaft 1 with the grid frame 3 rotates, grid wire 7 is withdrawn from a supply reel 5, said wire being wound on the grid frame 3.

In order to maintain the tensile force in the grid wire 7 between the supply reel 5 and the grid frame 3, the supply reel 5 is braked by means of a blade wheel 11, rotating with the reel and located in the path of a flow of air 9. The flow of air 9, produced by a compressor 13, reaches the wheel via a tube 15. The grid frame 3 and an air flap 17 are preferably arranged in the same plane. As an alternative, however, the air flap 17, may be displaced with respect to the grid frame 3. The air flap 17 in accordance with its position in the tube 15, passes a larger or smaller portion of air passing through the section of the tube. The stream of air passed strikes the blades 19, located in front of the tube opening and tends to rotate the wheel 11 and the supply reel 5 the direction opposite that indicated by the arrow 21. The flow of air 9 thus has a braking effect on the supply reel 5. The larger the opening of the tube section controlled by the air flap, the greater the quantity of air impinging on the blades of the wheel 11 and the more vigorously the supply reel 5 is braked. Since the air flap 17 is fixed on the driving shaft 1 of the grid frame 3, the braking of the supply reel 5 can be adapted by means thereof to the varying needs. If the braking effect must be comparatively high, because the grid wire is withdrawn slowly from the supply reel 5, the air flap 17 leaves a large portion of the tube section open. If, on the contrary, the wire 7 is rapidly wound off the supply reel 5 and is drawn from the winding area nearest the reel 5 towards a remote area before it touches the next-following grid rod in the direction of rotation, the air flap 17 closes off a larger portion of the tube section, so that the maximum braking effect is small. The tensile force of the grid wire is thus kept substantially constant.

Figure 4:
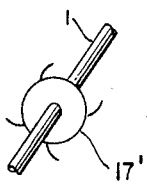
FIG. 4 shows a control member according to a modification of the invention.

If the body to be wound has a cubical shape the control member 17' would take the form shown in FIG. 4.

Figure 2:
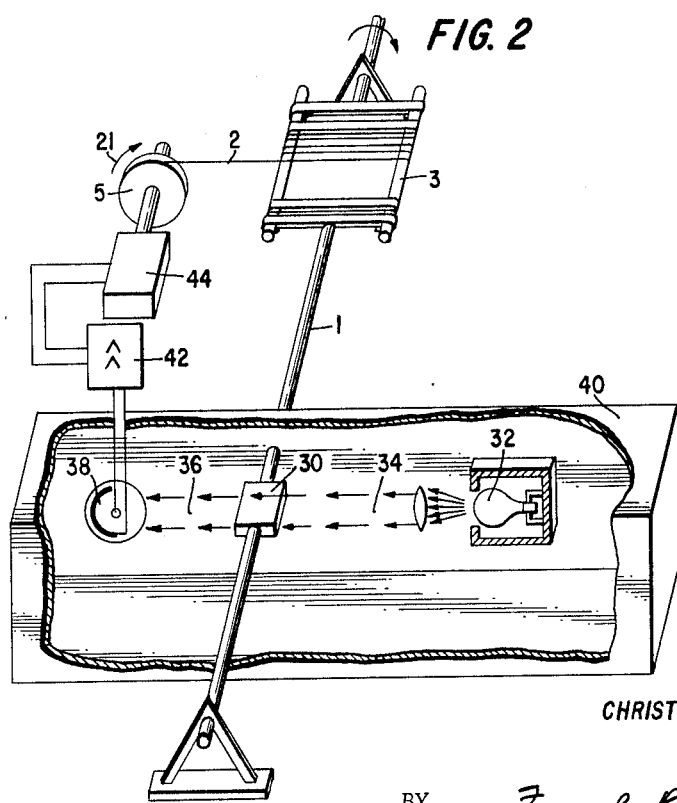
FIGS. 2 and 3 show devices in which the control-member acts upon a beam of luminous rays.

In the embodiment shown in FIG. 2 grid wire 7 is wound by a grid frame 3 arranged on a driving shaft 1 from a supply reel 5. The driving shaft 1 is provided with a covering plate 30, arranged in the plane of the grid frame 3. In this embodiment a light source 32 produces a beam of rays 34, which can be screened by the plate 30 to a greater or lesser extent. The intensity-varying beam 36, passing the covering plate, strikes a photo-electric cell 38, in which current or voltage variations are produced. In order to exclude light from the outside, the light system is arranged in a closed space 40.

The currents or voltages produced in the photo-cell 38 and matching the varying conditions of rotation of the grid frame 3 are amplified in an amplifier 42 and fed to an electro-motive or electro-mechanical brake 44. The brake may be formed by an A.C. motor brake or an eddy-current brake.

Figure 3:
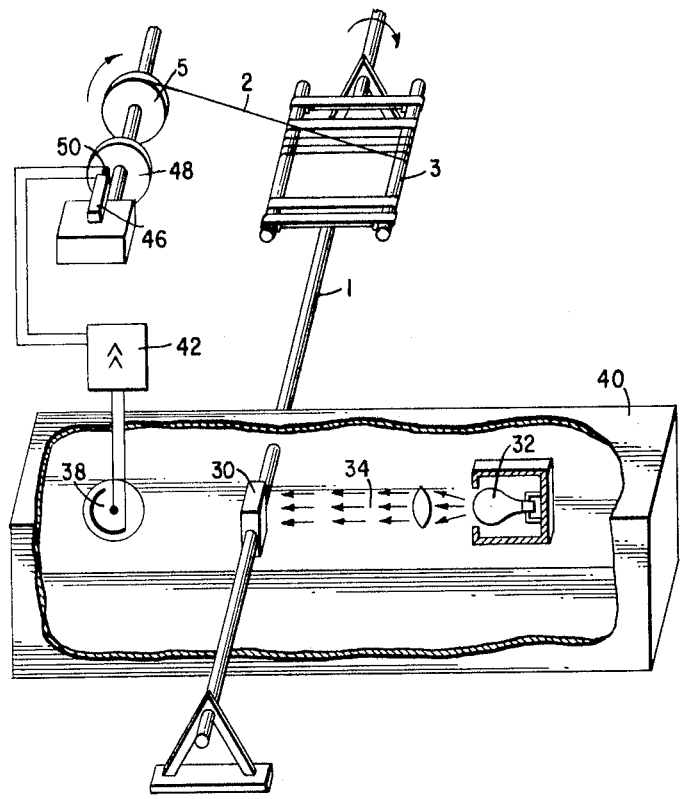

The device operates with full reliability even if the rotating masses of the various brakes 44 and of the supply reel 5 are small. The device becomes operative with only little inertia at a variation in the condition of rotation of the frame 3. The most rapid response is obtained with a magnetic brake shown in FIG. 3, in which a preferably oxidic-ceramic permanent magnet 46 is arranged in front of a braking disc 48, for example of aluminum. Between the magnet 46 and the braking disc 48 there is arranged a coil 50, the inner diameter of which corresponds approximately with the diameter of the magnet 46. The magnetic field of the magnet 46 brakes the braking disc 48 only with the maximum force occurring in operation. The stronger the current passing through the coil 50 in accordance with the incident light on the photo-cell 38, the greater is the compensation of the opposite field by the magnetic field of the coil 50. Thus the braking force is reduced. When magnetic brakes are employed, the grid frame 3 and the covering plate 30 must, of course, be secured to the driving shaft 1 so as to be orthogonal to each other, since with an increasing radiation intensity on the photo-cell 38 the braking effect is not amplified but weakened.

What is claimed is:

1. Apparatus comprising a supply reel having a wire coil, a body to be wound with said wire, said body having an asymmetrical shape, a reel shaft rotatable with said supply reel and a driven shaft for rotating said body, brake means for braking said reel shaft and means for applying and releasing said brake means including a control member having a similar asymmetrical shape rotated synchronously with said driven shaft for controlling the operation of said means for applying and releasing said brake.

2. Apparatus according to claim 1 wherein said brake means comprises a blade wheel secured on said reel shaft and said means for braking and releasing said reel shaft comprises a source of fluid medium under pressure, means for directing said medium against said blade wheel for braking said reel shaft, and said asymmetrical control member cooperating with said medium directing means for decreasing the flow of said medium against said blade wheel for releasing the braking force on said reel shaft.

3. Apparatus according to claim 1, wherein said control-member comprises a bladed body the number of blades of which corresponds with the number of asymmetrical portions of the body to be provided with the winding.

4. Apparatus comprising a supply reel having a wire coil, a body to be wound with said wire, said body having an asymmetrical shape, a reel shaft rotatable with said supply reel and a driven shaft for rotating said body; brake means comprising an electro-motive means co-operating with said reel shaft and said means for braking and releasing said reel shaft comprising a beam source of light, a light beam detector and energy amplifying means coupled with both said light beam and said light beam detector, and an asymmetrical control member comprising a light beam interrupting means.

5. Apparatus according to claim 4 wherein said control-member comprises a bladed body the number of blades of which corresponds with the number of asymmetrical portions of the body to be provided with the winding.

References Cited by the Examiner

UNITED STATES PATENTS

| 1,976,611 | 10/1934 | Gulliksen | 318—6 |
| 2,406,846 | 9/1946 | Muller | 242—9 |
| 2,777,545 | 1/1957 | Rockett | 242—75.4 X |
| 3,092,764 | 6/1963 | Cooper | 318—6 |

FOREIGN PATENTS

| 865,022 | 4/1961 | Great Britain. |
| 1,008,696 | 2/1952 | France. |

MERVIN STEIN, *Primary Examiner.*